United States Patent
Vyas et al.

(10) Patent No.: US 11,775,457 B1
(45) Date of Patent: Oct. 3, 2023

(54) COMMAND PATTERN SEQUENCER FOR MEMORY CALIBRATION

(71) Applicant: XILINX, INC., San Jose, CA (US)

(72) Inventors: Amit Vyas, Hyderabad (IN); Ramakrishna Reddy Gaddam, Hyderabad (IN); Karthikeyan Palanisamy, Coimbatore (IN)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/183,183

(22) Filed: Feb. 23, 2021

(51) Int. Cl.
*G06F 13/16* (2006.01)

(52) U.S. Cl.
CPC .................. *G06F 13/1689* (2013.01)

(58) Field of Classification Search
CPC .................................................. G06F 13/1689
USPC ..................... 710/6, 7, 15, 62, 104
See application file for complete search history.

(56) References Cited

U.S. PATENT DOCUMENTS

| | | | | |
|---|---|---|---|---|
| 6,549,994 B1* | 4/2003 | Noh | ...................... | G11C 11/419 711/168 |
| 6,598,155 B1* | 7/2003 | Ganapathy | .............. | G06F 9/381 711/110 |
| 6,826,679 B1* | 11/2004 | Laurenti | ............. | G06F 9/30047 712/225 |
| 8,966,327 B1* | 2/2015 | Wang | ..................... | G06F 11/008 714/49 |
| 2004/0054864 A1* | 3/2004 | Jameson | ............. | G06F 13/1689 711/167 |
| 2005/0144372 A1* | 6/2005 | Walker | ................ | G06F 13/1694 711/105 |
| 2007/0226476 A1* | 9/2007 | Cohen | ................. | G06F 9/30181 712/245 |
| 2008/0028136 A1* | 1/2008 | Schakel | .............. | G06F 13/1636 711/106 |
| 2010/0333098 A1* | 12/2010 | Jordan | .................. | G06F 9/3855 718/103 |
| 2011/0246708 A1* | 10/2011 | Li | ........................ | G06F 13/4243 711/103 |
| 2012/0260137 A1* | 10/2012 | Berke | ..................... | G11C 29/50 714/E11.159 |
| 2014/0089646 A1* | 3/2014 | Diewald | ............... | G06F 9/3861 712/234 |
| 2017/0248989 A1* | 8/2017 | Vrudhula | .................. | G06F 1/10 |

* cited by examiner

*Primary Examiner* — Idriss N Alrobaye
*Assistant Examiner* — Henry W Yu
(74) *Attorney, Agent, or Firm* — Patterson + Sheridan, LLP

(57) ABSTRACT

In one example, a command pattern sequencer includes a set of registers to store values used to configure a command sequence for configuring a memory. The command pattern sequencer further includes state machine circuitry coupled to the set of registers, the state machine circuitry configured to generate and execute the command sequence. The command pattern sequencer still further includes timing circuitry configured to manage timing between commands of the command sequence.

20 Claims, 8 Drawing Sheets

500

| | A1 | A2 | A3 | A4 | A5 | A6 | A7 | A8 |
|---|---|---|---|---|---|---|---|---|
| 541 | CMD_0 Activate_Row | Outer Loop Limit 0 | Outer Next CMD Delay 10 | Outer Next CMD CMD_1 | Inner Loop Limit 0 | Inner Loop Delay X | Inner Next CMD Delay X | Inner Next CMD X |
| 542 | CMD_1 Write_1 | Outer Loop Limit 0 | Outer Next CMD Delay 0 | Outer Next CMD CMD_2 | Inner Loop Limit 0 | Inner Loop Delay X | Inner Next CMD Delay X | Inner Next CMD X |
| 543 | CMD_2 Write_2 | Outer Loop Limit 5 | Outer Next CMD Delay 7 | Outer Next CMD CMD_3 | Inner Loop Limit 0 | Inner Loop Delay X | Inner Next CMD Delay 2 | Inner Next CMD CMD_1 |
| 544 | CMD_3 Read_1 | Outer Loop Limit 0 | Outer Next CMD Delay 0 | Outer Next CMD CMD_4 | Inner Loop Limit 0 | Inner Loop Delay X | Inner Next CMD Delay X | Inner Next CMD X |
| 545 | CMD_4 Read_2 | Outer Loop Limit 5 | Outer Next CMD Delay 15 | Outer Next CMD CMD_5 | Inner Loop Limit 0 | Inner Loop Delay X | Inner Next CMD Delay 3 | Inner Next CMD CMD_3 |
| 546 | CMD_5 NOP | Outer Loop Limit 20 | Outer Next CMD Delay 25 | Outer Next CMD CMD_6 | Inner Loop Limit 3 | Inner Loop Delay 2 | Inner Next CMD Delay 5 | Inner Next CMD CMD_1 |
| 547 | CMD_6 Precharge | Outer Loop Limit 0 | Outer Next CMD Delay 0 | Outer Next CMD CMD_last | Inner Loop Limit 0 | Inner Loop Delay X | Inner Next CMD Delay X | Inner Next CMD X |

FIG. 5

COMMAND PATTERN SEQUENCER FOR MEMORY CALIBRATION

TECHNICAL FIELD

Embodiments of the present invention generally relate to dynamic random access memory (DRAM), and in particular to a command pattern sequencer for memory calibration systems.

BACKGROUND

Memory interface calibration systems generally have several calibration stages that are required for calibrating the data path as well as the address/control path. Each of these calibration stages requires its own command sequence. A command sequence generally contains not only write or read commands, but various other types of commands. These other types of commands may include, for example, a mode register write command, a multi-purpose command (MPC), an activate command, a pre-charge command, a refresh command, or an inter-signal interference (ISI) pattern on address lines.

Conventional command sequencers are able to sequence up to three unique commands, and the sequence may be iterated multiple times. Such conventional command sequencers generally use a dedicated hardware block to perform fast memory initialization sequences. Because a main calibration command generator needs to be reconfigured multiple times, this slows down the initialization sequence. Moreover, because this dedicated initialization hardware block has no use after an initialization is performed, providing it in a memory interface results in hardware inefficiency.

Additionally, in order to perform a special training sequence such as, for example, command address training, which involves repeated toggling of the address lines, separate hardware is needed. This is because a command address training command sequence cannot be generated in a standard main generator, which supports only specific commands. Thus, once again, this added dedicated hardware block adds to the hardware inefficiency.

In addition, such conventional command sequencers Hardware is inefficient because of separate hardware for initialization sequence, address calibration pattern and patterns for other calibration stages.

SUMMARY

Various command pattern sequencers are described herein. Methods of command pattern sequencing for configuring a memory are also described herein. In one example, a command pattern sequencer includes a set of registers to store values used to configure a command sequence for configuring a memory. The pattern sequencer further includes state machine circuitry coupled to the set of registers, the state machine circuitry configured to generate and execute the command sequence, and timing circuitry, coupled to the set of registers and to the state machine circuitry, the timing circuitry configured to manage timing between the commands of the command sequence.

In another example, a method of command pattern sequencing for configuring a memory includes receiving at least one user defined command set sequence for configuring a memory, the user defined command set sequence used to at least one of initialize the memory, calibrate address lines, or implement a desired command sequence for any calibration stage. The method further includes executing the command set sequence on a memory interface.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 is an example command sequence, according to an example.

To facilitate understanding, identical reference numerals have been used, where possible, to designate identical elements that are common to the figures. It is contemplated that elements of one embodiment may be beneficially incorporated in other embodiments.

DETAILED DESCRIPTION

In one or more examples a hardware block is provided. The hardware block may be provided on a memory interface, for example a DRAM interface, and may generate customizable pattern sequences. In one or more examples, the hardware block sequences a user defined pattern on address/command/data lines in a user defined order. For example, in one example, up to 32 user defined patterns for a Double Data Rate 5 Synchronous Dynamic Random-Access Memory (DDR5) or Low-Power Double Data Rate 5 Synchronous Dynamic Random-Access Memory (LPDDR5) memory may be sequenced on the address/command/data lines. In one or more examples the patterns may be connected in a linked list format, where each pattern node has two next pointers to form a desired sequence. Therefore, each pattern node has two execution configurations, referred to herein as "inner" and "outer."

For example, in one use case up to 32 unique commands may be generated in any desired order. Such a sequence of commands is akin to a linked list of DRAM commands/addresses that may be used to initialize the DRAM, calibrate address lines or implement a desired command sequence for any calibration stage. Additionally, in one or more examples, multiple different command/address sequences may be loaded upfront and may then be called as required at different times at different calibration stages. Thus, in one or more examples, the hardware block operates as a generic unit. In this manner, reconfiguration time while switching the calibration stages may be saved.

Prior to describing various examples, some additional context regarding the limitations of current command sequencers is next described. To illustrate these limitations, the following example may be considered. A desired command sequence is to first send a row activate command, which is then followed by repetition of a column write-read command ten times, which is then followed by a pre-charge command. To implement this command sequence using conventional command sequencers, six steps are required, as follows:

1. Configure the command sequencer to send a row activate command;

2. Wait for the execution completion of the row activate command;

3. Configure the command sequencer to send ten write-read commands;

4. Wait for the execution of the ten write-read command sequence to complete;

5. Configure the command sequence to send a precharge command; and

6. Wait for the execution of the precharge command to complete.

Thus, using a conventional command sequencer three configuration iterations are needed, each followed by an associated wait transaction. Additionally, a conventional command sequencer is limited to sending only a single address write and read command. However, in order to stress the data lines there is a need to send and receive different data patterns, and, as a result, multiple address locations in memory must be accessed. This is simply not possible with current command sequencers.

Figure 1:
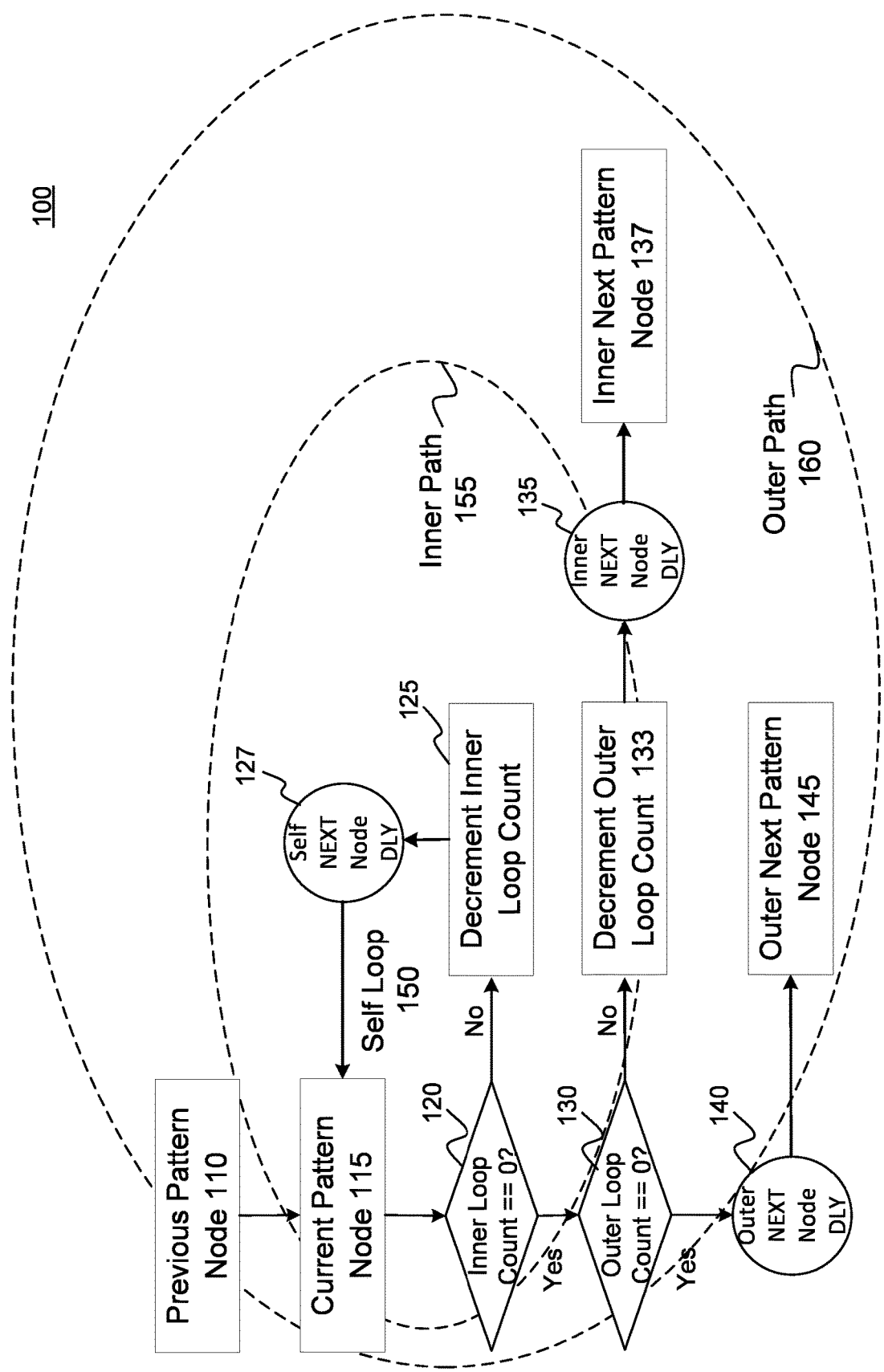
FIG. 1 is a process flow diagram illustrating sequencing of a previous pattern, a current pattern and a next pattern, according to an example.

FIG. 1 is a process flow diagram illustrating a method 100 of sequencing of a previous pattern, a current pattern and a next pattern, according to an example. Method 100 includes blocks 110 through 145. In alternate examples method 100 may include greater, or fewer, blocks, and the blocks may be performed in a different order. In one or more examples, a user defined pattern may be received from a user or an application. As noted above, in one or more examples, a user defined pattern may be connected in a linked list format, where each pattern node has two next pointers to form a desired sequence. Therefore, each pattern node has two execution configurations, an inner one and an outer one. The execution configuration specifies what will be a next pattern node to be executed, as well as any desired delay prior to execution of the next pattern. In one or more examples, the execution of the sequence begins at a start pointer and ends at an end pointer.

With reference to FIG. 1, method 100 begins at block 110, at a previous pattern node. From block 110 method 100 proceeds to block 115 to begin execution of a current pattern node. An inner loop count determines how many times to execute the current pattern, by passing through self loop 150. Thus, from block 115 method 100 proceeds to query block 120, where it is determined if the inner loop count is equal to 0. If the response to query block 120 is "No", then method 100 proceeds through self loop 150, through block 125 where the inner loop count is decremented, then to block 127 where a self next node delay is implemented. From block 127 method 100 returns to block 115 and executes the current pattern again. In this manner, method 100 will continue to pass through self loop 150, executing the current pattern, until the inner loop count is equal to 0. When this occurs, and thus the response to query block 120 is "Yes", method 100 proceeds to query block 130, which is the first block in inner path 155, and which regulates how many passes through the inner path 155 method 100 will make.

Thus, at query block 130 it is determined if the outer loop count is equal to 0. If the response to query block 130 is "No", then method 100 proceeds through inner path 155, through block 133 where the outer loop count is decremented, then to block 135 where an inner next node delay is implemented. From block 135 method 100 proceeds to block 137 and executes the inner next pattern. In this manner, method 100 will continue to pass through inner path 155, executing the inner next pattern at each pass through the inner path, until the outer loop count is equal to 0 at query block 130. When this occurs, and thus the response to query block 130 is "Yes", method 100 proceeds to block 140, on outer path 160. At block 140, method 100 100 executes an outer next node delay. At block 145 method 100 executes an outer next pattern node, and, though not shown, continues to execute a self loop, inner path and outer path, just as is shown in FIG. 1 for the current pattern, until such time as there is no outer next pattern.

Figure 2:
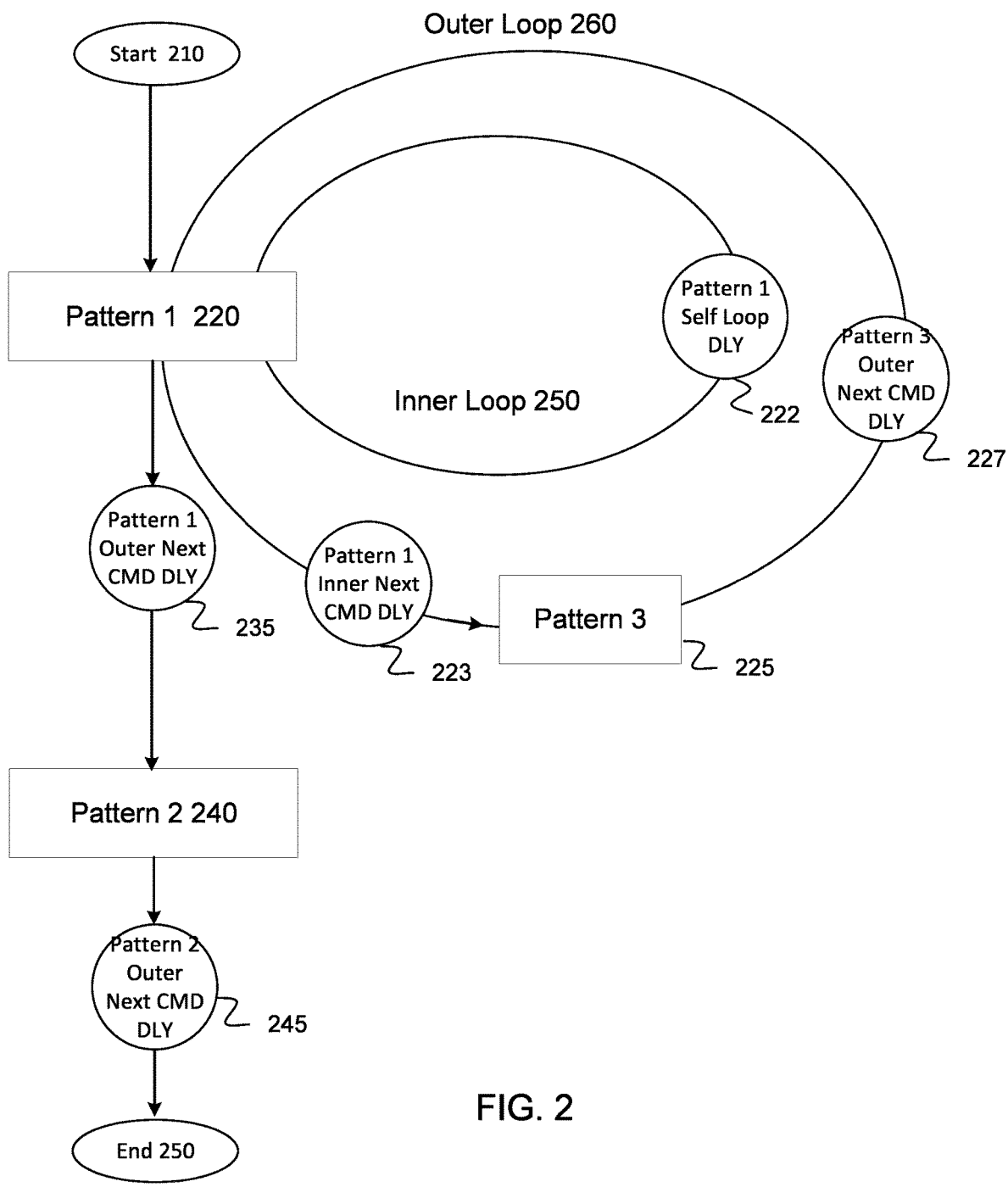
FIG. 2 is process flow diagram for pattern sequence execution, according to an example.

FIG. 2 is process flow diagram for a method 200 of pattern sequence execution, according to an example. FIG. 2 is a simplified version of the process flow illustrated in FIG. 1. Method 200 includes blocks 210 through 250. In alternate examples method 200 may include greater, or fewer, blocks, and the blocks may be performed in a different order.

With reference to FIG. 2, method 200 begins at start block 210, where a current pointer is loaded, which fetches a pattern node, along with its inner and outer loop configuration based on the current pointer index.

From start block 210 method 200 proceeds to block 220 to begin execution of the current pattern node, Pattern 1. The command/address/data pattern is driven on the memory interface lines, the inner loop count is decremented, and pattern 1 self loop delay is executed at block 222. Method 200 proceeds to iterate through inner loop 250 until the inner loop count becomes 0. When the inner loop count is equal to 0, method 200 proceeds from block 220 to iterate the outer loop 260, beginning with block 223, where a Pattern 1 inner next command delay is executed. At block 225 an out loop pattern, Pattern 3 is executed. As was the case for Pattern 1, the command/address/data pattern of Pattern 3 is driven on the memory interface lines, followed by, at block 227, execution of a Pattern 3 outer next command delay. Method 200 proceeds to iterate through outer loop 260, including to pass through block 220 and thus execute Pattern 1, until the outer loop count becomes 0. When the outer loop count is equal to 0, method 200 proceeds from block 220 to outer loop next command delay, at block 235, or else it switches to inner loop next command. At block 240 Pattern 2 is executed, and thus, as above, the command/address/data pattern of Pattern 2 is driven on the memory interface lines, followed by, at block 245, execution of a Pattern 2 outer next command delay. Finally, when the current pointer reaches an end pointer value, then the sequence completion is indicated, and method 200 ends at end block 250.

Figure 3:
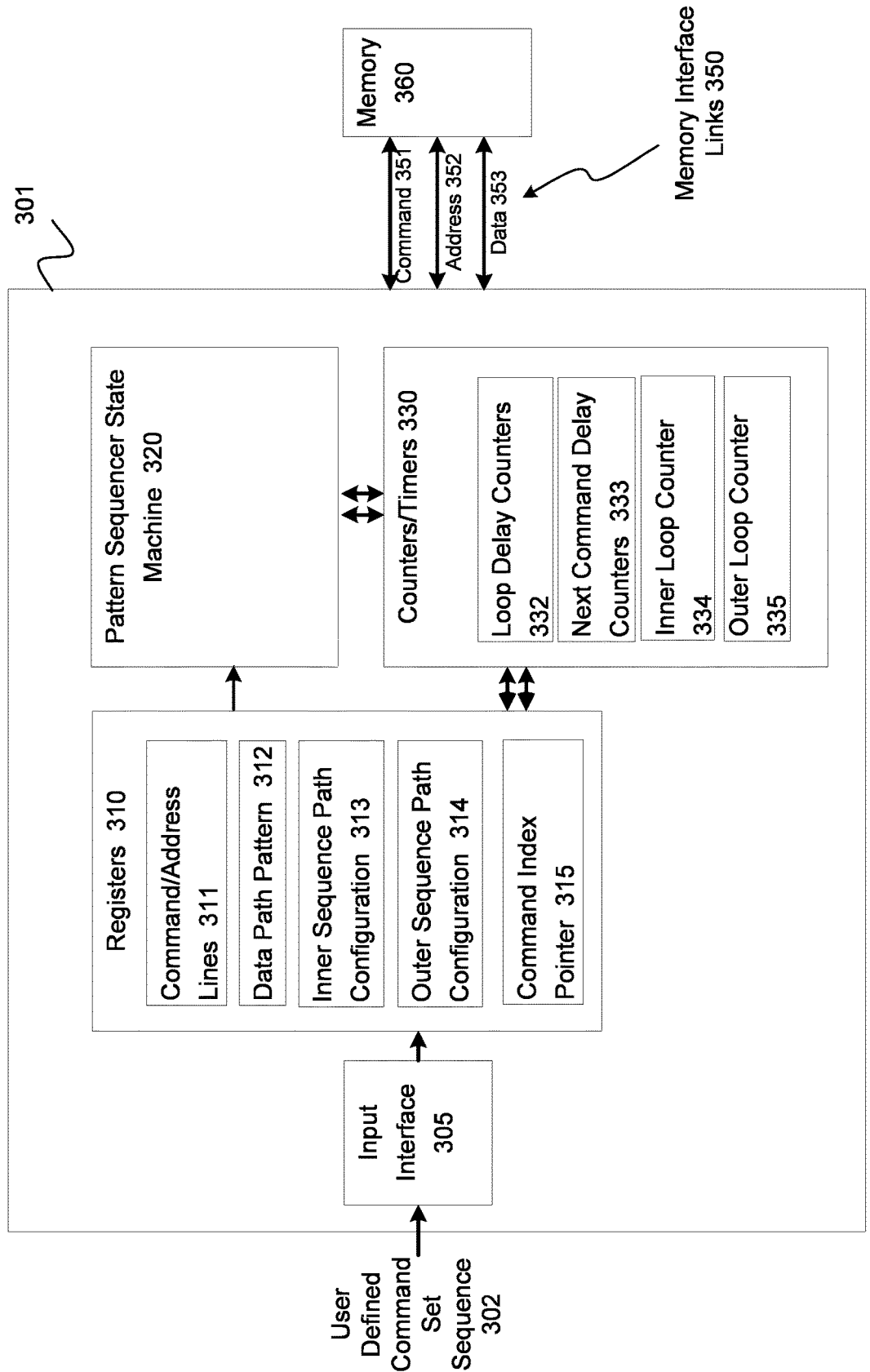
FIG. 3 is a schematic drawing of an example hardware block, according to an example.

FIG. 3 is a schematic drawing of an example hardware block 301, according to one or more examples. Hardware block 301 may be provided, for example, in a memory interface (not shown), and hardware block 301 may be, or may be a part of, a memory controller of the memory. Hardware block 301 may be disposed, for example, in a DRAM interface, a mobile industry processor interface (MIPI), or, for example, in any binary sequence pattern generator. Block 301 may be alternatively provided in a programmable device. Still alternatively, instead of being implemented as hardware, block 301 may be implemented as firmware running on a processor. In one or more examples, the example hardware block 301 has an input interface 305, for receiving a user defined pattern sequence 302 from, for example, an application or a processor. Additionally, in one or more examples, hardware block 301 has three main parts or elements, namely registers 310, pattern sequencer state machine 320, and counters/timers 330. These three elements are next described.

With reference to FIG. 3, registers 310 include a configuration and status register space, which may be arranged to configure flow of the command/pattern generation as well as monitoring of the status of the command/pattern generation sequence. In one or more examples, there may be five sets of registers in this register space. These are next described.

First, in one or more examples, there may be a set of command and address lines registers 311, which may be implemented as, for example, a 32 bit set of registers CMD_ADDR[31:0]. These registers may indicate a value of address/command lines for one tCK (an SDRAM clock period) on a memory interface. For example, the memory controller to SDRAM clock ratio may be 1:4. Thus, in one memory controller clock, values of address/command lines for 4 tCKs may be provided for 4 such registers, which may be, for example, CMD_ADDR_tck0, CMD_ADDR_tck1, CMD_ADDR_tck2, and CMD_ADDR_tck3. In one or more examples, all four of these registers may be associated with the same index. In one example there may be 32 such register groups indexed from 0 to 31, as shown in Table A below.

TABLE A

| Bit field range | Field Name | Field width | Field description |
|---|---|---|---|
| 31:0 | CA | 32 | Address lines value for 1 tck duration. Field width may be customized based on SDRAM Command/Address line width. |

Second, in one or more examples, there may be a set of data path (DQ) pattern registers 312. For example, the set of data path pattern registers may be a 32 bit set of registers DQ_PATTERN[31:0]. In one or more examples, the set of DQ pattern registers indicates a data pattern on a data path associated with a CMD_ADDR register group for one memory controller clock, or for four memory device clocks. If the CMD_ADDR register causes a write data transaction on the data lines, then the DQ pattern indicated by this register is driven out on the DQ lines. Moreover, if the CMD_ADDR register causes a read data transaction on the data lines, then the DQ pattern indicated by this register may be used to compare with the received data pattern from the DQ lines. In one or more examples, this register indicates the pattern for only four DQ lines and the same pattern is considered for other DQ lines. For example, if there are 32 DQ lines then the same four line pattern may be used for DQ[3:0], DQ[7:4], DQ[11:8], . . . DQ[31:28]. In one example, there may be 32 such register groups indexed from 0 to 31, as shown below in Table B. In one or more examples, each register has a one to one mapping with the CMD_ADDR registers 311.

TABLE B

| Bit field range | Field Name | Field width | Field description |
|---|---|---|---|
| 3:0 | DQ_PATTERN_tCK00 | 4 | DQ[3:0] for first half of first tCK of the Controller clock |
| 7:4 | DQ_PATTERN_tCK01 | 4 | DQ[3:0] for second half of first tCK of the Controller clock |
| 11:8 | DQ_PATTERN_tCK10 | 4 | DQ[3:0] for first half of second tCK of the Controller clock |
| 15:12 | DQ_PATTERN_tCK11 | 4 | DQ[3:0] for second half of second tCK of the Controller clock |
| 19:16 | DQ_PATTERN_tCK20 | 4 | DQ[3:0] for first half of third tCK of the Controller clock |
| 23:20 | DQ_PATTERN_tCK21 | 4 | DQ[3:0] for second half of third tCK of the Controller clock |
| 27:24 | DQ_PATTERN_tCK30 | 4 | DQ[3:0] for first half of fourth tCK of the Controller clock |
| 31:28 | DQ_PATTERN_tCK31 | 4 | DQ[3:0] for second half of fourth tCK of the Controller clock |

Third, in one or more examples, there may be a set of inner sequence path configuration registers 313, for example, a 32 bit set of registers CMD_EXE_CONFIG_INNER[31:0]. In one or more examples, these registers are responsible for configuring a CMD/ADDRESS pattern sequence on an inner sequence path. In one or more examples, these registers may facilitate linking of CMD_ADDR pattern and delays between their respective execution on the inner sequence path. In this example there are 32 such register groups indexed from 0 to 31, a shown below in Table C. In one or more examples, each register has a one to one mapping with the CMD_ADDR registers 311, described above.

TABLE C

| Bit field range | Field Name | Field width | Field description |
|---|---|---|---|
| 9:0 | LOOP_DLY | 10 | It indicates delay in controller clock cycle in execution of the CMD_ADDR pattern in single loop iteration |
| 15:10 | LOOP_CNT | 6 | It indicates the loop iteration count |
| 16 | KEEP_CMD | 1 | It indicates whether to keep the same CMD_ADDR pattern during the LOOP_DLY wait time or keep a default pattern |
| 26:17 | NEXT_CMD_DLY | 10 | It indicates delay in execution of next command, pointed by NEXT_CMD_IDX, after completion of LOOP_CNT |
| 31:27 | NEXT_CMD_IDX | 5 | It indicates next command to be executed after completing of LOOP_CNT |

Fourth, in one or more examples, there may be a set of outer sequence path configuration registers 314, for example, a 32 bit set of registers CMD_EXE_CONFIG_OUTER[31:0]. In one or more examples, these registers are responsible for configuring a CMD/ADDRESS pattern sequence on an outer sequence path. In one or more examples, these registers may facilitate linking of CMD_ADDR pattern and delays between their respective execution on the outer sequence path. In this example there are 32 such register groups indexed from 0 to 31, a shown below in Table D. In one or more examples, each register has a one to one mapping with the CMD_ADDR registers 311, described above.

TABLE D

| Bit field range | Field Name | Field width | Field description |
|---|---|---|---|
| 6:0 | LOOP_CNT | 7 | It indicates number of entries to execute the associated CMD_ADDR pattern register. Until the count reaches to LOOP_CNT its next command execution is based on INNER NEXT_CMD_IDX. After completion of the LOOP CNT it follows the outer NEX_CMD_IDX. |
| 7 | KEEP_CMD | 1 | It indicates whether to keep the same CMD_ADDR pattern during the NEXT_CMD_DLY wait time or keep a default pattern |
| 17:8 | NEXT_CMD_DLY | 10 | It indicates delay in execution of next command, pointed by NEXT_CMD_IDX, after completion of LOOP_CNT |
| 22:18 | NEXT_CMD_IDX | 5 | It indicates next command to be executed after completing of LOOP_CNT |

Fifth, in one or more examples, there may be a command index pointer register 315, for example a CMD_IDX_POINTER register. In one or more examples, this register indicates an index of a current command being executed, and thus functions in similar manner to a program counter of a processor.

Continuing with reference to FIG. 3, the example hardware block 301 may also include a pattern sequencer state machine 320, which may, for example, be implemented in dedicated circuitry within the example hardware block 301. Alternatively, it may be implemented in software, or in a programmable device, such as a field programmable gate array (FPGA). The operation of the pattern sequencer state machine 320 is described in detail below, with reference to process flow 400 which is illustrated in FIGS. 4A and 4B.

Finally, the example hardware block 301 may also include counters/timers 330, configured to manage timing between the generated commands/patterns. With reference to FIG. 3, these counters may include loop delay counters 332, next command delay counters 333, inner loop counter 334, and outer loop counter 335. The values in these counters are used by pattern sequencer state machine 320, as is described in detail below with reference to process flow 400 illustrated in FIGS. 4A and 4B.

Figure 4A:
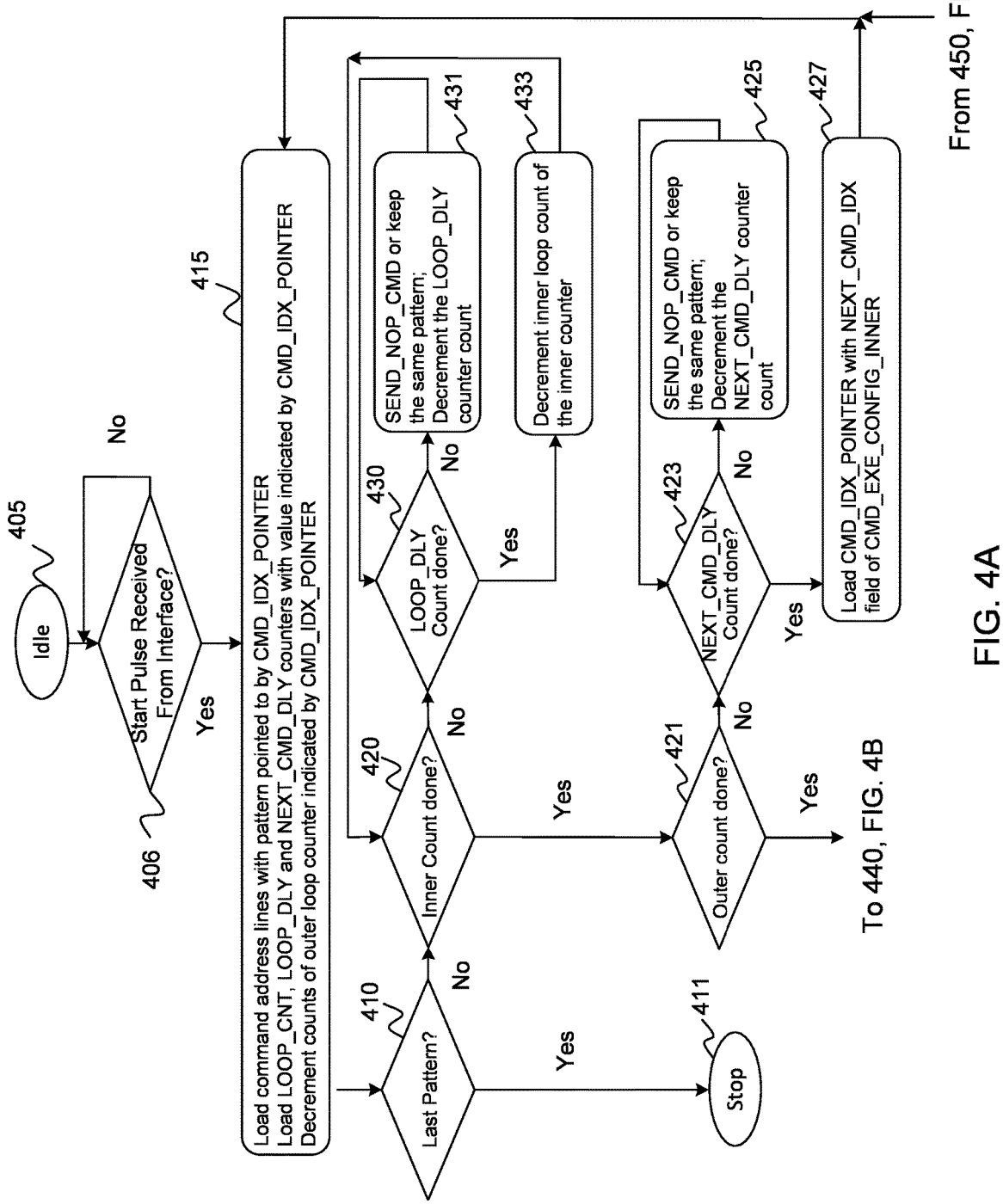
FIG. 4A is a first portion of a flow diagram for pattern sequencing by a state machine or sequencer, according to an example.
Figure 4B:
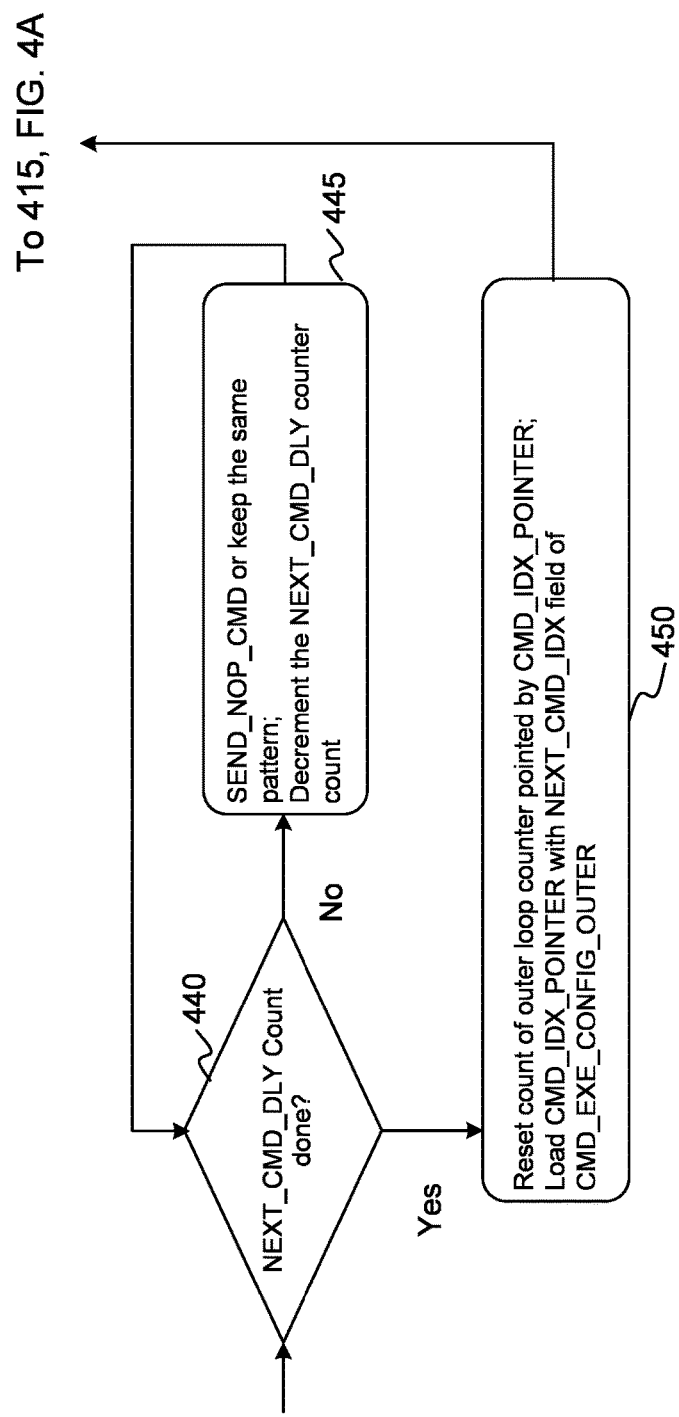
FIG. 4B is a second portion of the flow diagram for pattern sequencing by a state machine or sequencer shown in FIG. 4A.

Next described, with reference to FIGS. 4A and 4B is the operation of pattern sequencer state machine 320, where FIG. 4A is a first portion of a flow diagram for a method 400 of pattern sequencing performed by the pattern sequencer state machine 320 of FIG. 3. Similarly, FIG. 4B is a second portion of the flow diagram of the method 400.

With reference to FIGS. 4A and 4B, method 400 includes blocks 405 through 450. In alternate examples method 400 may include greater, or fewer, blocks, and the blocks may be performed in a different order.

As shown in FIG. 4A, Method 400 begins at 405, where the pattern sequencer is in an idle state. At query block 406 the pattern sequencer determines if a start pulse has been received, via input interface 305, from a processor, or user application. If the return at query block 406 is "Yes", and thus the start pulse has been received, then method 400 proceeds to block 415, and if the return is "No", then method 400 remains at query block 406. At block 415, after receiving the start pulse, method 400 performs three tasks. It loads the command-address-data pattern associated with index pointed by the CMD_IDX_POINTER, it loads LOOP_CNT, LOOP_DLY and NEXT_CMD_DLY counters with the values indicated by CMD_IDX_POINTER, which points to, for example, an internal state machine, and it decrements a count of outer loop counter indicated by CMD_IDX_POINTER, which, as described above, is stored in register 315 of FIG. 3.

At query block 410 method 400 checks whether the CMD_IDX_POINTER matches with the LAST_CMD_IDX, which is, as noted, stored in the internal state machine. If it does match, then method 400 stops the sequence at block 411 and asserts a done signal to a module or unit that includes the pattern generator. If, however, at query block 410 it is determined that there is no match with a last command, then the pattern sequencer continues to run the sequences configured by the CMD_EXE_CONFIG registers, namely registers 313 and 314 of FIG. 3. With every controller clock, 4 tCK pattern, and CMD_ADDR_tck0/1/2/3, there are associated CMD_EXE_CONFIG registers, which provide what a next command index is, and what delay is to be executed before loading the next command.

As shown in FIG. 3, described above, the CMD_EXE_CONFIG register has been divided in two parts. These include a first part, CMD_EXE_CONFIG_INNER, and a second part, CMD_EXE_CONFIG_OUTER. In one or more examples, any combination of them forms a desired pattern sequence. As shown in FIG. 4A, method 400 first repeats the CMD_ADDR pattern pointed by the CMD_IDX_POINTER based on LOOP_CNTS of CMD_EXE_CNFIG_INNER, with a number of NOP commands as configured in LOOP_DLY of CMD_EXE_CONFIG_INNER. Following that, method 400 checks whether all the LOOP_CNT of CMD_EXE_CNFIG_OUTER completed or not. If not then method 400 sends a number of NOP commands, as configured in NXT_CMD_DLY of CMD_EXE_CNFIG_INNER, and loads a next command index, as configured in NXT_CMD_IDX of CMD_EXE_CNFIG_INNER. It proceeds to repeat the same procedure until the loop limit of the outer loop, configured in LOOP_CNT of CMD_EXE_CNFIG_OUTER, is reached. After reaching the outer loop limit method 400 then sends a number of NOP commands, as configured in NXT_CMD_DLY of CMD_EXE_CNFIG_OUTER, and then loads a next command index, as configured in NXT_CMD_IDX of CMD_EXE_CNFG_OUTER and repeats the same procedure until it reaches to the last command index.

It is noted, based on the above description, that when the inner loop limit equals 0, there is no repetition of the same command, so that the inner loop delay is ignored. Similarly, when the outer loop limit is equal to 0, then there is no execution of the inner next command, so that both the inner next command and its associated delay are ignored.

In particular, continuing with reference to FIG. 4A, in response to a "No" at query block 410, then at query block 420 method 400 determines whether the inner count has completed. If "No", at query block 420, then at query block 430 method 400 determines if the loop delay count has completed. If "Yes" at query block 430, then at block 433 the inner loop count of the inner counter is decremented, and method 400 returns to query block 420. If "No" at query block 430, then at block 431, method 400 either sends a NOP command or repeats the same pattern (command), decrements the loop delay counter count, and returns yet again to query block 430. This loop through blocks 430 and 431 is repeated until the response at query block 430 is "Yes", in which case the process flow described above through block 433, and a return to query block 420 is implemented.

Continuing with reference to FIG. 4A, if, on the other hand, the response at query block 420 is "Yes", then at query block 421 method 400 determines if the outer count has completed.

If "No", at query block 421, then at query block 423 method 400 determines if the next command delay count has completed. If "Yes" at query block 423, then at block 427 CMD_IDX_POINTER register (for example, register 315 in FIG. 3) is loaded with a NEXT_CMD_IDX filed of the CMD_EXE_CONFIG_INNER register (see Table C above), and method 400 returns to block 415 to proceed yet again to block 410, as described above. However, if the response is "No" at query block 423, then at block 425, method 400 either sends a NOP command or repeats the same pattern (command), decrements the next command delay counter count, and returns yet again to query block 423. In one or more examples, this loop through blocks 423 and 425 is repeated until the response at query block 423 is "Yes", in which case the process flow described above through block 427 and a return to block 415 is implemented.

Continuing still further with reference to FIG. 4A, if, on the other hand, the response at query block 421 is "Yes", then the remaining process flow is illustrated in FIG. 4B, which is a continuation of FIG. 4A.

With reference to FIG. 4B, if the response at query block 421 is "Yes", then at query block 440 method 400 determines if the next command delay count has completed. If "Yes" at query block 440, then at block 450 two actions occur. First, the count of the outer loop counter that is pointed to by the CMD_IDX_POINTER register (for example, register 315 in FIG. 3) is reset. Second, CMD_IDX_POINTER is loaded with the NEXT_CMD_IDX field of the CMD_EXE_CONFIG_INNER register (see Table C above), and method 400 returns to block 415 to proceed yet again to block 410, as described above. However, if the response is "No" at query block 440, then at block 445, method 400 either sends a NOP command or repeats the same pattern (command), decrements the next command delay counter count, and returns yet again to query block 440. In one or more examples, this loop through blocks 440 and 445 is repeated until the response at query block 440 is "Yes", in which case the process flow described above through block 450 and a return to block 415 is implemented.

Method 400 terminates a complete process at block 450, and, as shown, may begin anew at block 415 for the next command, which is pointed to by the NEXT_CMD_IDX field of the CMD_EXE_CONFIG_INNER register.

FIG. 5 illustrates an example command sequence that may be executed in one or more example hardware blocks, such as, for example, hardware block 301 of FIG. 3. With reference to FIG. 5, the command sequence has been configured to send seven command-address-data patterns (from CMD 0 541 to CMD 6 547) in a defined sequence. In this example, the sequence starts from index 0.

Continuing with reference to FIG. 5, each command has the same structure. Thus, there are eight fields for each command, and these fields are indicated by a column or field designator of A1 through A8, shown above each column. The fields include a command index A1, an outer loop limit A2, an outer next command delay A3, an outer next command A4, an inner loop limit A5, and inner loop delay A6, an inner next command delay A7, and finally, an inner next command A8. The function of each of these eight fields will become apparent in the following description of each of the seven commands 541 through 547.

Beginning with the first row, which is CMD_0 541 (where the numeral following the word "CMD" is a command address index), an activate_row command is specified to be executed one time (indicated by inner loop limit A5=0). The A5 field thus indicates how many times to perform the command. The execution of the command one time is to be followed by execution of 10 NOP commands (indicated by the value of outer next command delay A3=10). Following the 10 NOP commands, the next command to be executed is CMD_1, as shown by the outer next command field A4.

Thus, continuing with CMD_1 542 (indicated by CMD_ADDR index 1), a first write command, write_1, is specified to be executed once (indicated by inner loop limit A5=0), and then to send no NOP commands (indicated by outer next command delay A3=0). Following CMD_1, the next command to be executed is, as shown by the outer next command field A4, CMD_2.

Continuing on to CMD_2 542 (indicated by CMD_ADDR index 2), a second write command, write_2, is to be executed once (indicated by inner loop limit A5=0), and then, following that, 2 NOP commands are to be executed (indicated by inner next command delay A7=2) and then, as indicated by the value of inner next command being CMD_1 (shown in inner next command A8=CMD_1), CMD_1 is to be executed in an inner loop. This pattern of CMD_2, 2 NOP, CMD_1 is to be repeated 5 times (indicated by outer loop limit A2=5). After completing the 5th iteration, 7 NOP commands are to be sent (as indicated by outer next command delay A3=7). Finally, following the five iterations and the seven NOPs, the next command to be executed is CMD_3, as shown by the outer next command field A4.

Continuing with CMD_3 544 (indicated by CMD_ADDR index 3), a first read command read_1 is specified to be executed once (indicated by inner loop limit A5=0), and then to send no NOP commands (indicated by outer next command delay A3=0). Additionally, the next command to be executed is CMD_4, as shown by the outer next command field A4.

Continuing with CMD_4 545 (indicated by CMD_ADDR index 4), a second read command, read_2, is to be executed once (indicated by inner loop limit A5=0), and then, following that single execution, 3 NOP commands are to be executed (indicated by inner next command delay A7=3), and to switch to CMD_3 (as indicated by inner next command A8=CMD_3). This pattern of CMD_4, 3 NOPs, CMD_3 is to be repeated 5 times (indicated by outer loop limit A2=5). After completing the 5th iteration, 15 NOP commands are to be executed (as indicated by outer next command delay A3=15). Additionally, the next command to be executed is CMD_5, as shown by the outer next command field A4.

Continuing with CMD_5 546 (indicated by CMD_ADDR index 5), a noteworthy change is seen. CMD_5 has both an inner loop limit (A5=3), and an inner loop delay (A6=2), unlike any of the other commands shown in FIG. 5. Thus, first, CMD_5, the NOP command, is to be executed, and then 2 NOPs also executed following the first NOP, as per A6, inner loop delay of 2. This sequence of NOP, followed by 2 NOP, is to be executed three times, as indicated by inner loop limit A5=3. Then, once the inner loop is completed, 5 NOP commands are to be executed, as indicated by inner next command delay A7=5, and the inner next command is to be executed, which is CMD_1 542 (as indicated by inner next command A8=CMD_1). CMD_1, as described above, is the write_1 command. This entire pattern is to be repeated 20 times (indicated by outer loop limit A2=20). Thus, after completing the 20th iteration, when outer loop limit has been decremented to equal 0, 25 NOP commands are to be executed (as indicated by outer next command delay A3=25). Following that, the next command to be executed is CMD_6, precharge, as shown by the outer next command field A4.

Continuing with CMD 6 547 (indicated by CMD_ADDR index 6), a precharge command is to be executed once (indicated by inner loop limit A5=0), but no NOP commands are to be executed (indicated by outer next command delay A3=0). Finally, there is no next command to be executed, as shown by the outer next command field A4=CMD_last, which means the sequence has ended.

Figure 6A:
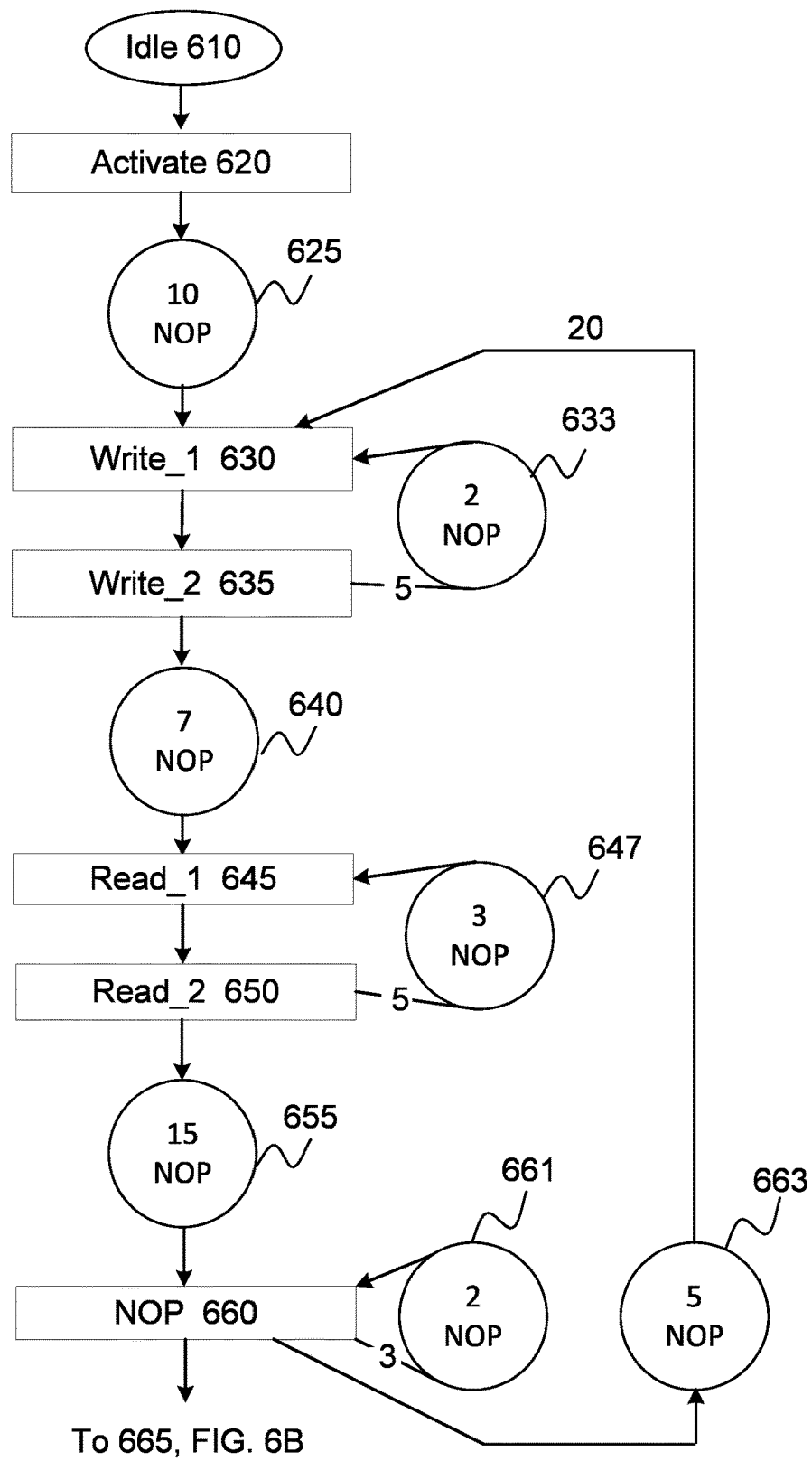
FIG. 6A is a first portion of an execution flow diagram for the example command sequence shown in FIG. 5.
Figure 6B:
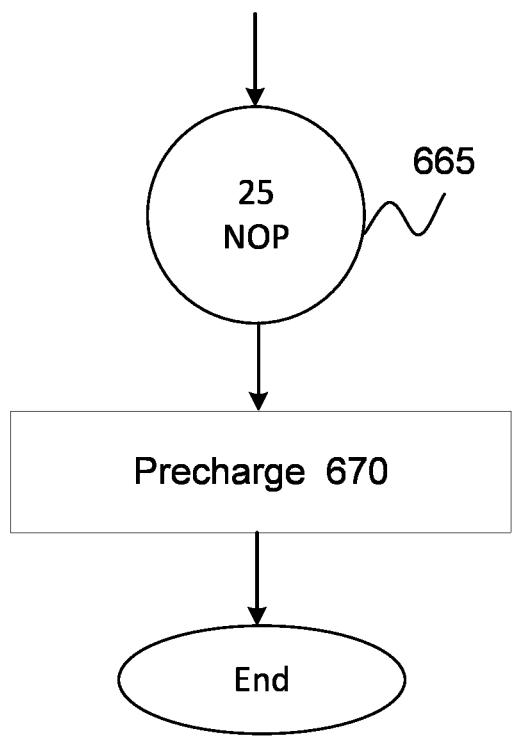
FIG. 6B is a second portion of the execution flow diagram for the example command sequence shown in FIG. 5.

FIGS. 6A and 6B illustrate, in process flow format, the execution of the example command sequence 500, illustrated in FIG. 5, and described above. Thus beginning at idle at block 610, at block 620 CMD_0 is executed, which is an activate command. This is followed by the specified outer next command delay of 10 NOP commands, as shown at block 625.

At block 630 CMD_1 is executed, which is the write_1 command, and execution moves to block 635, where CMD_2 is executed, which is the write_2 command. This is followed by 2 NOPs, at block 633, and a return to CMD_1 at block 630, as described above. This sequence is repeated 5 times, as shown by the "5" adjacent to block 635, which represents the outer loop limit A2=5 for CMD_2. After the 5th iteration of the sequence, execution moves to block 640, where 7 NOPs are executed as per A3, the outer next command delay, and execution proceeds to the next command, CMD_3.

At block 645 CMD_3 is executed, which is a read_1 command, and execution moves to block 650, where CMD_4 is executed, which is the read_2 command. This is followed by 3 NOPs, at block 647, and a return to CMD_3 at block 645, which command is the inner next command for CMD_3, as described above. This sequence is also repeated 5 times, as shown by the "5" adjacent to block 650, as per the outer loop limit A2=5. After the 5th iteration, execution moves to block 655, where 15 NOPs are executed, as per the outer next command delay of CMD_4, and execution switches to the next command, CMD_5.

At block 660 CMD_5 is executed, which is a NOP command. This is followed by 2 NOPs, at block 661, and a return to block 660. This sequence is to be repeated 3 times, as shown by the "3" adjacent to block 660, which represents the inner loop limit A5=3 for CMD_5. From block 660 execution returns to block 530, where CMD_1, the wrtie_1 command, is executed. This entire sequence is to be repeated 20 times, as per the value of A2, outer loop limit=20 for CMD_6. After completing the 20th iteration, at block 665 on FIG. 6B, 25 NOP commands are to be executed, as per the outer next command delay A3=25 for CMD_6, following which CMD_7, a precharge command, is executed at block 570, where execution ends.

Thus, in one or more examples a command pattern sequencer has a number of advantages. It is scalable to support next generation SDRAM interfaces. Moreover, it may support any pattern on the command/address/data lines, and its pattern generation is not specific to any SDRAM protocol. It one or more examples, the command pattern sequencer may be configured to send many unique command sequences in any desired order with programmable delays. It can schedule all possible DRAM commands (opcode) and data, because it may drive any user-defined pattern on all DRAM interface pins. In one or more examples, a command pattern sequencer supports special modes of DRAM operation. Write leveling command sequencing. Extended commands and data. SDR and DDR Command rates. Slow clock and fast clock mode.

No need of separate hardware for generating DRAM Initialization sequence, Address pattern for the address calibration, command sequencer for any other calibration sequence that makes it hardware efficient. The command sequence order is not just sequential which means it can form any linked list of commands sequences. It can have many sub sequences that has their own repetition counters and delay counters. It allows multiple address location access in single iteration to drive multiple data pattern to stress the data lines for the data path calibration.

It allows the loading of a new sequence for a next calibration stage while executing a sequence for a present calibration stage. In this way the configuration time can be hidden. Simplified hardware reduces the hardware verification efforts and it improves usage model for the firmware that results in reduced time to market. In tests performed by the inventors, an example command pattern sequencer saved calibration time by 5-8% and hardware size by 25-30% when compared to conventional architectures.

While the foregoing is directed to embodiments of the present invention, other and further embodiments of the invention may be devised without departing from the basic scope thereof, and the scope thereof is determined by the claims that follow.

What is claimed is:

1. An apparatus, comprising:
 a memory interface calibration system comprising a command pattern sequencer that comprises,
  a set of registers;
  an input interface configured to load the registers with values of a user-defined command set sequence;
  state machine circuitry configured to execute the user-defined command set sequence based on the values loaded in the registers; and
 counter circuitry configured to maintain counts associated with execution of the user-defined command set sequence;
 wherein the user-defined command set sequence comprises a linked-list of command patterns, wherein a first one of the command patterns includes a command to be executed as a current command, a number of times to execute the current command, a pointer to a command of one of the command patterns to be executed as an inner loop command, a number of times to execute the inner loop command, a pointer to a command of another one of the command patterns to be executed as an outer loop command, and a number of times to execute the outer loop command.

2. The apparatus of claim 1, provided in a memory interface.

3. The apparatus of claim 2, wherein the memory interface is a dynamic random access memory (DRAM) interface.

4. The apparatus of claim 1, wherein the first command pattern further includes indications of delays to be imparted between the current command and the inner loop command and between the current command and the outer loop command.

5. The apparatus of claim 1, wherein the linked-list of command patterns comprises more than three command patterns.

6. The apparatus of claim 5, wherein the linked-list of command patterns comprises up to 32 command patterns.

7. The apparatus of claim 1, wherein the state machine circuitry is further configured to execute multiple user-defined command set sequences at respective memory calibration stages.

8. The apparatus of claim 2, further comprising:
memory; and
command, address, and communications links between the memory interface and the memory.

9. The apparatus of claim 8, wherein the memory comprises dynamic random access memory (DRAM) or synchronous DRAM (SDRAM).

10. The apparatus of claim 1, wherein the linked-list of command patterns include respective commands selected from a group comprising;
a row activate command;
a pre-charge command;
a refresh command; and
a command to place an inter-signal interference pattern on address lines.

11. The apparatus of claim 1, wherein the set of registers includes a command/address lines register, a data pattern register, an inner sequence path configuration register, an outer sequence path configuration register, and a command index pointer register.

12. The apparatus of claim 1, provided in a memory controller.

13. A method, comprising:
loading registers with values from a user-defined command set sequence that comprises a linked-list of command patterns, wherein a first one of the command patterns comprises a command to be executed as a current command, a number of times to execute the current command, a pointer to a command of one of the command patterns to be executed as an inner loop command, a number of times to execute the inner loop command, a pointer to a command of another one of the command patterns to be executed as an outer loop command, and a number of times to execute the outer loop command; and
executing the user-defined command set sequence on a state machine based on the values loaded in the registers to initialize a memory, calibrate address lines, and/or calibrate the memory.

14. The method of claim 13, wherein the first command pattern further includes an indications of delays to be imparted between the current command and the inner loop command and between the current command and the outer loop command.

15. The method of claim 13, wherein the linked-list of command patterns comprises more than three command patterns.

16. The method of claim 15, wherein the linked-list of command patterns comprises up to 32 command patterns.

17. The method of claim 13, wherein the linked-list of command patterns include respective commands selected from a group comprising:
a row activate command;
a pre-charge command;
a refresh command; and
a command to place an inter-signal interference (ISI) pattern on address lines.

18. The method of claim 13, further comprising executing multiple user-defined command set sequences at respective memory calibration stages by the state machine.

19. The method of claim 13, performed by a memory controller provided in a memory interface to a memory.

20. The method of claim 19, wherein the memory is a dynamic random access memory (DRAM) or a synchronous dynamic random access memory (SDRAM).

* * * * *